(12) United States Patent
Bolt

(10) Patent No.: US 6,467,014 B1
(45) Date of Patent: Oct. 15, 2002

(54) AUTOMATIC MAPPING AND EFFICIENT ADDRESS TRANSLATION FOR MULTI-SURFACE, MULTI-ZONE STORAGE DEVICES

(75) Inventor: David A. Bolt, Colorado Springs, CO (US)

(73) Assignee: Plasmon LMS, Inc., Colorado Springs, CO (US)

( * ) Notice: Subject to any disclaimer, the term of this patent is extended or adjusted under 35 U.S.C. 154(b) by 0 days.

(21) Appl. No.: 09/515,536

(22) Filed: Feb. 29, 2000

(51) Int. Cl.$^7$ ............................................... G06F 12/00
(52) U.S. Cl. ..................... 711/4; 711/170; 711/202; 711/209; 711/112; 711/220; 711/221
(58) Field of Search ........................... 711/4, 170, 202, 711/209, 112, 220–221

(56) References Cited

U.S. PATENT DOCUMENTS 5,978,336 A * 11/1999 Mine et al. .................... 369/58
6,084,731 A * 7/2000 Uchida et al. ................. 360/48
6,181,497 B1 * 1/2001 Malone, Sr. .................. 360/48

* cited by examiner

Primary Examiner—Do Hyun Yoo
Assistant Examiner—Mehdi Namazi
(74) Attorney, Agent, or Firm—Oppenheimer Wolff & Donnelly LLP

(57) ABSTRACT

Automated address mapping is achieved by a system and methodology which automatically reacts to changes in the disk configuration. Prior to utilizing the disk, disk configuration information is provided by the user resulting in a stored configuration table. This configuration table is then used to compute an address translation structure which can be later used to perform actual address mapping operations. Utilizing this address translation structure, in combination with appropriate formulas, address mapping from a logical block address, provided by the host computer, to a surface-track-sector address (STSA) is easily accomplished. By having the actual address translations dependent upon the configuration table, the system and method automatically reacts to changes in the disk configuration.

23 Claims, 3 Drawing Sheets

| | | CONFIGURATION TABLE | | | |
|---|---|---|---|---|---|
| | START TRACK | END TRACK | LENGTH | ZONE | TYPE |
| RANGE 1 | -1 | -1 | 1 | 0 | RESERVED AREA |
| RANGE 2 | 0 | 1 | 2 | 0 | USER AREA |
| RANGE 3 | 2 | 3 | 2 | 1 | USER AREA |
| RANGE 4 | 4 | 5 | 2 | 1 | TEST AREA |
| RANGE 5 | 6 | 7 | 2 | 2 | USER AREA |
| RANGE 6 | 8 | 9 | 2 | 3 | USER AREA |
| RANGE 7 | 10 | 10 | 1 | 3 | RESERVED AREA |

| | START TRACK | END TRACK | LENGTH | ZONE | TYPE |
|---|---|---|---|---|---|
| RANGE 1 | -1 | -1 | 1 | 0 | RESERVED AREA |
| RANGE 2 | 0 | 1 | 2 | 0 | USER AREA |
| RANGE 3 | 2 | 3 | 2 | 1 | USER AREA |
| RANGE 4 | 4 | 5 | 2 | 1 | TEST AREA |
| RANGE 5 | 6 | 7 | 2 | 2 | USER AREA |
| RANGE 6 | 8 | 9 | 2 | 3 | USER AREA |
| RANGE 7 | 10 | 10 | 1 | 3 | RESERVED AREA |

FIG. 3

AUTOMATIC MAPPING AND EFFICIENT ADDRESS TRANSLATION FOR MULTI-SURFACE, MULTI-ZONE STORAGE DEVICES

BACKGROUND OF THE INVENTION

The present invention relates to large capacity data storage devices. More specifically, the present invention relates to a system and method for automatic mapping and address translation for data storage systems having multi-surface, multi-zone storage devices.

Today's computers have many different data storage needs. These needs can be satisfied by a large number of storage devices such as disk storage systems, hard drivers, tape storage systems, etc. These systems communicate with the host computer and manage the actual data storage task. Typically, data is transferred to and from the storage devices as a contiguous stream of logical blocks, wherein each block has a unique logical block address (LBA). This information, identified by the logical block address, must then be stored at some physical location in the data storage device.

In the case of a disk storage device, the storage area is arranged in surface-track-sector addresses (STSA). Each LBA referred to by the host computer must be mapped to a unique STSA on the storage device in order to accommodate easy identification and retrieval. As a further complication to this mapping requirement, the storage devices will often employ multiple surfaces, and multiple zones on the storage media. Efficient use of these multiple surfaces and zones must be considered when devising the mapping and subsequent translations methodology.

Once a data storage and retrieval methodology is established, it is extremely difficult to make adjustments. If a new disk configuration is introduced, the established mapping methodology must be reworked. As would be expected a new configuration requires the development of new address mapping and translation formulations, including further testing and validation.

When using storage devices with multiple surfaces, it is often beneficial to read data from or write data to both sides of the disk simultaneously. This helps to increase the overall data rate of the storage device. However, this complicates the mapping and data storage methodologies. Specifically, the data storage methodology is much more complicated because two read/write heads must be continually utilized, and the addressing must be maintained for both those surfaces.

As mentioned above, certain data storage devices have multiple zones on a surface thereof. Each zone is typically an area on the surface wherein each track within the zone has similar characteristics. More specifically, a zone is typically identified as a group of tracks which all have the same number of sectors on each track. For example, a disk may be broken into four different zones wherein the tracks in the first zone have two sectors per track, the second zone have four sectors per track, the third zone have six sectors per track, and the last zone have eight sectors per track. The number of zones contained on a disk, and the number of sectors per track within that zone will depend upon the physical set up and configuration of the disk, as dictated by the manufacturer.

In order to solve the mapping problems, prior systems have utilized a "hardcoded" algorithm. That is, the data was mapped to the disk using a predetermined set of instructions for the particular disk configuration. While this solution was efficient, it was not capable of providing for varying disk configurations. For example, if the number of sectors per track in a given zone changed, or the number of tracks changed, the code had to be rewritten. This is an undesired activity as it is extremely costly and time consuming.

SUMMARY OF THE INVENTION

In order to maintain effective data transfer rates using a data storage device with multiple surfaces and multiple zones, and to automatically react to changes in the disk configuration, the present invention provides an automated mapping technique and system for a general STSA configuration. In order to map from an LBA to an STSA, a configuration table (CT) is used which specifies the physical configuration of the storage device. This configuration table is utilized to automatically generate address translation formulations. Consequently, a modification of the disk configuration for the particular storage device, will result in a modified configuration table. This will then automatically change the address translation formulation.

An address translation structure, is used to accommodate efficient address translation formulations. This address translation structure utilizes a Physical Block Address (PBA) as an intermediate tool in the translation. Utilizing the above mentioned configuration table, the physical block address is correlated to each available sector on the disk. This PBA helps to simplify the address translation formulations.

As a starting point, information about the disk layout is input by the user. This includes providing range definitions for the disk surfaces which identifies those areas available for user data storages, and those areas designated for other purposes. Collection of all range definitions is assembled in the configuration table which identifies the layout of the disk. Specifically, the configuration table will identify which tracks on the disk are available for user data storage and which tracks are not. Also, the user will provide the number of sectors per track in the particular zones, and any desired pairing information. Based on this information, an address translation structure is developed. This address translation structure, along with appropriate translation formulas, will then allow fast and efficient address mapping.

As the host computer provides directions regarding data storage and retrieval, the address translation structure provides a useful mechanism for accomplishing the necessary mapping. When information is provided by host computer and identified by a logical block address (LBA), this information will be assigned and stored at one or more sectors, each sector identified by a physical block address. The LBA and its associated physical block addresses are easily calculated using the address translation structure and associated formulas. These formulations allow for easy retrieval and identification of stored information.

As can be easily recognized, this methodology allows the disk configuration to be easily modified, without detrimentally affecting the remainder of the addressing scheme. More specifically, a change in the disk configuration, will show up as a change to the configuration table. Since all other mapping steps are dependent upon the configuration table, changing its contents will automatically change the steps and information used by the remainder of the addressing scheme. Consequently, these additional changes are automatically passed down.

It is an object of the present invention to provide an address mapping and translation system which can easily and quickly react to changes in the disk configuration. Consequently, various disk configurations can easily be changed without requiring large amounts of reprogramming.

It is a further object of the present invention to provide an address mapping and translation system which utilizes an easily modifiable configuration table. The configuration table itself defines the various ranges and configurations for the disk itself.

It is a further object of the present invention to provide a data mapping system which easily converts a logical block address, provided by a host computer, to a surface-track-sector address. This surface-track-sector address identifying a specific data sector on the data storage media.

BRIEF DESCRIPTION OF THE DRAWINGS

Further objects and advantages of the present invention can be seen by reviewing the following detailed description in conjunction with the drawings in which:

FIG. 3 is a graphical illustration of portions of an exemplary configuration table;

DETAILED DESCRIPTION OF PREFERRED EMBODIMENTS

The disk system of the present invention easily reacts to changes in the disk configuration by maintaining a configuration table (CT) which defines the layout of the disk. This configuration table is input by the user, based on information provided by the disk manufacturer and the chosen disk set-up. This configuration table is then utilized for all further mapping and translation operations. Consequently, the disk system easily reacts to changes in this configuration table by automatically adjusting its mapping process and methodology.

Figure 1:
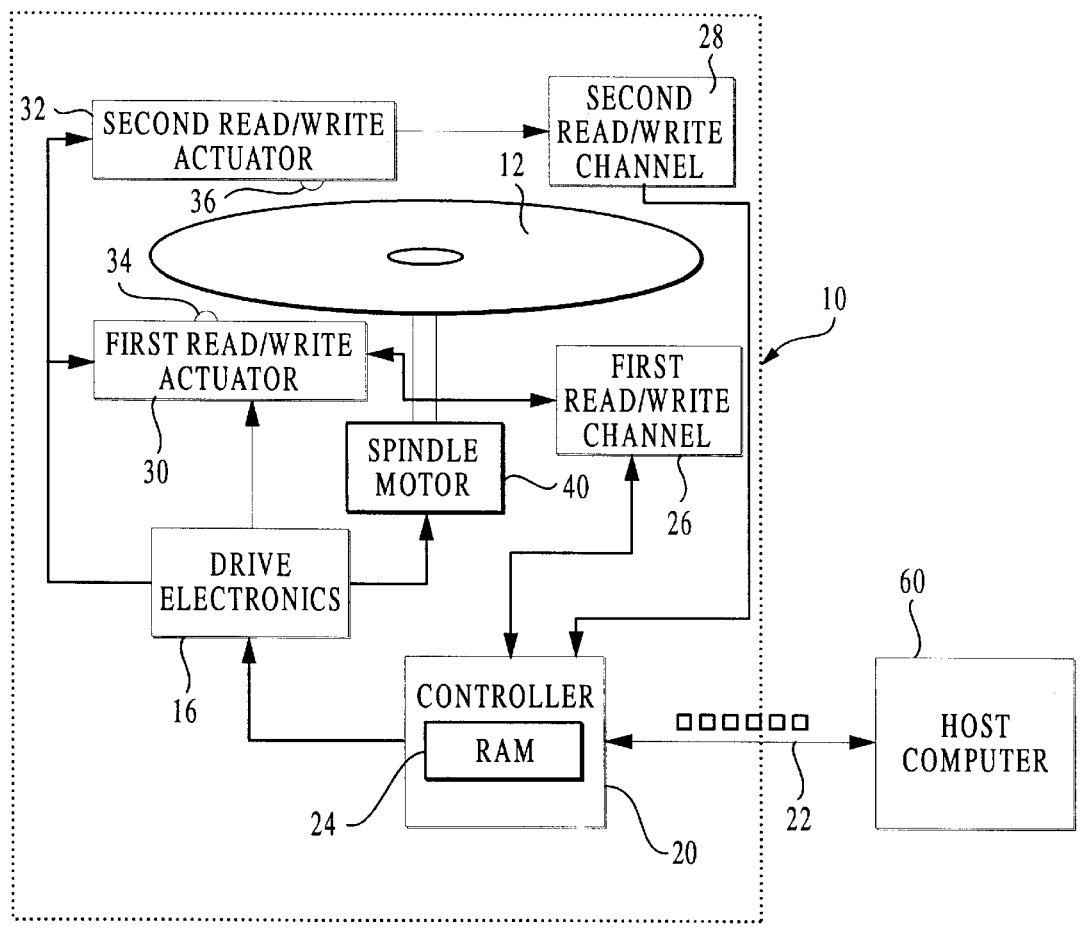
FIG. 1 is a schematic drawing illustrating the disk storage system and host computer.

Referring now to FIG. 1, there is shown a schematic diagram of the disk storage system 10 which must appropriately perform the necessary mapping and translations. Obviously, disk storage system 10 receives requests from host computer 60. One core component of storage system 10 is an optical media 12. Optical media 12 could include an optical disk, however is not necessarily limited to that type of storage media. Disk storage system 10, necessarily has a read/write head 34 incorporated therein for writing data to the optical media 12 as well as reading data therefrom. In the embodiment shown, both a first read/write head 34 and a second read/write head 36 are necessary as two sides of optical media 12 are being used. Disk storage system 10 further includes drive electronics 16 for operating the functions of the drive. Also associated is a drive controller 20 which includes a memory or RAM 24. Interacting with the output from first read/write head 34 is a first read/write channel 26 which necessarily includes an internal decoder (now shown). First read/write channel 26 provides a data path from media 12 to controller 20. Similarly, a second read/write channel 28 is provided for transferring data from second read/write head 36 to controller 20. By operating both first read/write channel 26 and second read/write channel 28, data can simultaneously be read from both sides of the disk, and provided to controller 20.

It will be understood that many variations could be incorporated into this component hardware. Also, various functions may be undertaken by controller 20 or may be controlled by other components, such as drive electronics 16. As seen in FIG. 1, controller 20 can be in communication with many other devices via host interface 22.

First read/write head 34 and second read/write head 36 includes various components which efficiently accommodate their operation. Specifically, a first read/write actuator 30 is included for accommodating motion for first read/write head 34. Similarly, a second read/write actuator controls the motion of second read/write head 36. It is understood that both first read/write actuator 30 and second read/write actuator 32 cooperate with drive electronics 16 to accomplish positioning and reading to writing from optical media 12.

Also included is a spindle motor 40 for controlling the rotational movement of optical media 12. Drive electronics 16 cooperate with all of these components to appropriately coordinate their functions and provide reading and writing capabilities.

Figure 2:
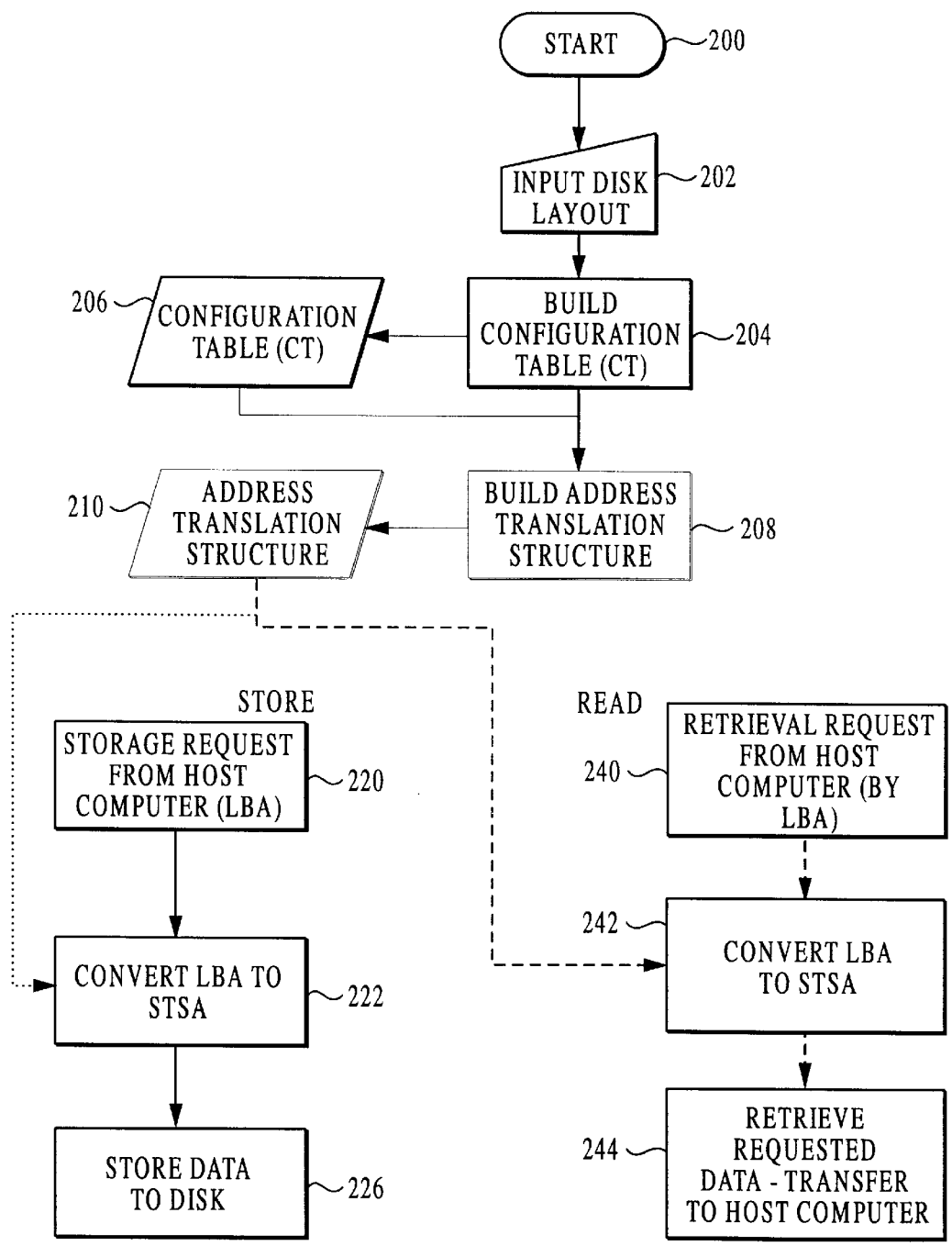
FIG. 2 is a flow chart illustrating the data storage methodology more specifically includes an easily altered configuration table.

Referring now to FIG. 2 there is showing a flow chart illustrating the data mapping methodology utilized by disk storage system 10. Reference is also made to Appendix A which includes one embodiment of the pseudo code capable of performing the steps of the present invention. As can be seen, this process starts at Step 200 as necessary. Next in Step 202 the disk layout information is input. As previously mentioned, this disk layout information would depend upon the particular configuration established by the manufacturer and the set-up chosen by the user. For example, the disk layout information will specify how many sides the disk has, how many zones each side includes, and details of the various user defined ranges. Each range is identified as the section of the disk that is allocated for a particular use. In certain circumstances, various areas at the edge may be reserved for set up and testing information. Furthermore, a range in the center may further be reserved for further test information. Lastly, the user areas are defined on the remainder of the disk. These user areas are then available for data storage operations. Additional information may be input by the user at this point to further assist in the address mapping operations. For example, the user will input the number of sectors per track in each of the designated zones, and may designate any pairing information that is desired. This pairing information will specify which zones may preferably be paired together to form an aggregate zone. For example, it is often desired to pair one zone from each side of the disk and collectively use those two zones in data storage operations. Consequently, information can be written to both sides of the disk simultaneously. Additional information about the configurations is shown in Appendix A where one embodiment of the specific stuctures filled in by the user is shown. Again, this information defines the physical structure and striping information for the disk.

After all disk layout information has been provided, as shown in Step 202, the system will then build a configuration table 206 (CT) in Step 204. The configuration table 206 specifies the details of the various ranges, including the location, and details about the number of sectors included in each range. Further details about the configuration table are described below in relation to FIG. 3.

Next, in Step 208 the address translation structures are created. These address translation structures include multiple characteristics of the data storage area, all of which is computed from the configuration table. For example, the start and end points and overall length of the various tracks are calculated. Details defining the range of zones can be calculated, the user addressable space can be calculated and defined, etc. Additionally, preexisting translation formulas are identified, which set forth the mechanisms to appropriately perform address translations. The resulting address translation structure is a set of data members which define the disk space. These data members are specifically configured to interact with the translation formulas. As further outlined below, each of these formulas and structures assist in the fast and efficient addressing of data. Again, further details regarding the computation of the Address Translation Structure (ATS) are found in Appendix A which includes one embodiment of the pseudo code capable of carrying out the address mapping functions.

At this point in the process, the set up operations are completed and the data storage device is ready for either storage or retrieval operations. It will be understood that these are related to the set up operations, however the read steps and storage steps are very independent operations as well.

In the storage process, the system first receives a storage request from the host computer in Step 220. This request typically includes multiple packets of data, and a logical block address (LBA) identifying these packets. Specifically, Host computer 60 provides the LBA and length of the data. This logical block address is noted by the system and utilized for further mapping operations. Next, in Step 222, the actual address translation takes place utilizing the address translation structure and formulas 210. Specifically, the logical block address is translated to a surface-track-sector address (STSA). Next in Step 226, the data packets provided are stored to the disk at the designated PBAs. Referring again to Appendix A, one example of this address translation is shown in further detail.

As mentioned above, the disk system of the present invention utilizes two surfaces of storage media 12. In order to speed the data transfer rate, data is written to or read from these two surfaces simultaneously. However, this creates an additional complication in the mapping structures. More specifically, the mapping structure must be able to accommodate a separation of data into a first component and a second component which are stored on the two different sides of the storage media 12. To accommodate this operation, the above-referenced pairing information is used. More specifically, this pairing information provides an association between each zone on a first side of the disk with another zone on a second side of the disk. In one version of the present invention, the zones are paired such that an inner zone on the first surface is paired with an outer zone on the second surface. Each next respective zone on the first surface, moving outward, is then prepared with an associated respective zone on the second surface, moving inward. By pairing the zones in this manner, the data transfer rate can be equalized as the sum of the data being read from the two paired zones will be relatively constant.

As can be appreciated, this operation, otherwise known as striping (i.e. data is striped to the two sides of the disk), further complicates the data mapping structures. However, the address translation structure and formulas already designated easily accommodate this complication. As mentioned above, the pairing information is initially input during the initialization process. For two paired tracks, the ratio of sectors per track between the two surfaces can be easily computed based on user input information. For example, a first track on a first side of the disk may include 62 sectors per track while a paired zone may include 95 sectors per track. Consequently, the ratio of sectors per track for these two paired zones is 62/95, or 0.65. Using this ratio, the data blocks received can be separated accordingly and directed to the appropriate surface of storage media 12.

Referring again to FIG. 1, it is seen that controller 20 includes inputs from both first read/write channel 26 and second read/write channel 28. Consequently, controller 20 is capable of separating all data accordingly by cooperating with those components.

As expected, a similar process is utilized when data is read from the storage media. In Step 240, a data retrieval request is received from the host computer, identifying the logical block address used. This LBA is again utilized to determine the associated STSA. This is accomplished in Step 242, which utilizes the Address Translation Structure 210 and preexisting formulas. Once the STSA is identified, the data located at those physical block addresses can easily be located and retrieved. This retrieval is done in Step 244 with information provided to the host computer.

As previously mentioned, the configuration table 206 is a basic element of all further mapping operations. Configuration table 206 is illustrated in more detail in FIG. 3. While utilizing configuration table 206 in this way, disk storage system 10 can easily react to changes in the storage media configuration. As previously mentioned, configuration 206 table sets forth the details of various ranges for the disk. For each particular range 260, a start track 262 and an end track 264 are identified. Configuration table 206 also includes the length 266 for this range. In order to determine the specific type of area designated, the zone 268 is designated. Each zone is defined by having a similar set of sectors per track. Thus by identifying the zone, the number of sectors per track is also known. Utilizing this information, the system can easily calculate the number of sectors available in any particular range. Lastly, the type of range 270 is identified. Again, this information provides the system with the necessary information to develop a necessary physical block addressing scheme and to identify those physical block addresses usable for data storage.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. Accordingly, the present invention is not limited in the particular embodiments which have been described in detail therein. Rather, reference should be made to the appended claims as indicative of the scope and content of the present invention.

APPENDIX A

I. Configuration Table to be filled by the User
The user fills in the following structures. These structures completely define the physical disk and striping for the disk.
ConfigurationTable Array of RangeDefinitions. The Configuration Table covers all tracks on the disk.
RangeDefinition
Start     Start Track for this disk range
End     End Track for this disk range.
Length     Number of tracks in this disk range
Zone     Zone number for this range
Type     Type of area for the disk
(e.g. USER AREA, RESERVED AREA etc. . .)
SectorsPerTrack     Auxiliary array specifying the number of sectors per track in each zone.
AggregateZoneDef     Auxiliary matrix defining which zones are paired together to form a striped aggregate.
II. Address Translation Structure to be Computed
Based on the configuration Table, pre-computation of the Address Translation Structure (ATS) is accomplished. This structure facilitates the address translation

APPENDIX A-continued formula provided by the invention. The
ATS is a hierarchical data structure given below in descending
(top down) order.
A. Overview of ATS
AddressTranslationStr    Top level address translation structure
LbaSpace    Defines the logical
address space for the entire disk.
Aggregate    Forms one contiguous LBA extent
from two groups of PBA extents.
DiskSide    Represents a physical side of the media.
DiskZone    Represents a group of contiguous
PBA's with the same number of
sectors per track.
StripeStructure    Facilitates address translation within a given track.
Range    Specifies a range of
tracks or sectors.
B. Details of ATS
AddressTranslationStr
FirstZone    First zone for this media
LastZone    Last zone for this media
DiskSide phys[]    Defines the full physical space covered by the media
DiskSide user[]    Defines the full user addressable space on the media
LbaSpace lspace    Defines the full LBA space of the media
LbaSpace
Range range    Range of LBAs covered by this LBA space structure
DiskSide phys[]    Array of disk sides defining the full PBA space
Aggregate ag[]    Array of aggregates comprising the full LBA space.
SectorsperAg[]    Array specialing the number of Sectors per Aggregate
Aggregate
Range range    Range of LBAs covered by the aggregate
DiskZone zone[]    Array of disk zones comprising the aggregate
DiskSide
Range range;    Range of tracks covered by this disk side.
DiskZone zone[]    Array of zones defining a side of a disk
DiskZone
Range range    Range of tracks defining a zone.
SectorsPerTrack    Sectors per track in the zone.
StripeStructure
Sector[]    Array providing fast translation
for LBA/PBA to Sector number
LbaCount[][]    Matrix providing fast translation for PBA/STSA to LBA
Pattern[]    Array providing fast translation for PBA/LBA to side info
Range    Auxiliary structure
Start    Start of range (track or sector number)
End    End of range (track or sector number)
Len    Length of range (number of tracks or sectors)
TrackRanges[]    Array of track ranges covered by each zone.
C.Computation of Address Translation Structure
The above data structures are computed in the following algorithms.
The structures are hierarchical and
shown in descending order (top down).
AddressTranslationStr
Pba = 0;    // Initialize PBA counter
LastZone = NO_ZONE    // Initialize the last zone
For each media side s
phys[s].range.set(Pba,0);    // Start of pba range on this side of
the disk
for each DiskRangeDef dr    // Compute phys and user
pba ranges in this loop
z = dr.zone    // Get the current zone
if z != LastZone    // Entering a new zone
spt = SectorsperTrack8k[z]    // Get Sectors Per track in this zone
phys[s].zone[].sects_per_track = spt
user[].zone[z].sects_per_track = spt
phys[s].zone[z].range.set(Pba,0)    II Init the start of a new physical zone
LastZone = z    // Save it so we know when we enter a new zone
PbaLen = dr.len * spt    // Number of pba's in this disk range
phys[s].zone[z].range.end = Pba + PbaLen-1    // Update the phys
end for this zone
phys[s].zone[z].range.len += PbaLen    // Add the phys length to this zone
phys[s].range.len += PbaLen    // Add the phys length to this side
if(dr.type == USER_AREA)
// Set the user area for this zone
user[s].zone[z].range.set(Pba, PbaLen)
// Should be only 1 user area per zone
Pba += PbaLen// Keep running pba value
phys[s].range.end = phys[s].range.start +phys[s].range.len − 1
range.set(phys[].range.start, phys[1 ].range.end-phys[0].range.start + 1)
Ispace.init(user, phys, type)

APPENDIX A-continued

ComputeStriping() // Compute the arrays which define the Iba-pba
mapping per aggregate sector
LbaSpace.Iinit(DiskSide user[].DiskSide *PhysInit InitType)
for all zones z
spt[z]=user[SideB].zone[z].sects per track
ag[z].zone[0]=user[].zone[AggregatezoneDef[z][0]]// SideA
ag[z].zone[]= user[1].zone[AggregatezoneDef[z][]]// SideB
Start =0    // Set the Iba range of each aggregate using each ag's zone
info
for all zones z
Length = ag[z].zone[0].range.len +ag[z].zone[1].range.len
ag[z].range.set(Start,Length)
Start += Length
SectorsperAg[z]= spt[AggregatezoneDef[z][0]+
spt[AggregatezoneDef[z][1]]
range.len =    //The LBA space is the sum of all aggregates
for all zones z
range.len += ag[z].range.len // Sum all aggregates
range.set(0, range.len)
ComputeStripin - computes the StripeStructure
for z=ZONE_START. .ZONE_END    // for all aggregates
SptA =SectorsperTrack[ZoneDef[z][0]]
SptB =SectorsperTrack[bZoneDef[z][1]]
SectorsPerGroup =SptA +SptB
GoalRatio = SptB/SptA
Ratio =GoalRatio +1
SectorA =SectorB =0 // Start both sides on sector 0
for gs=0. .SectorsPerAg // Go from cnt (Iba offset number) =
1 . . SectorsPerAg
if(Ratio>=GoalRatio) // Current ratio is greater than the goal
Stripe[z].Pattern[gs]=SideA // Insert an A side sector
Stripe[z].LbaCount[SideA][SectorA]=gs
// Number of LBAs to reach this A side sector
sec =SectorA++// Move to the next sector on side A
else
Stripe[z].Pattern[sgt]=SideB // Insert a B side sector
Stripe[z].LbaCount[SideB][Sector[1]]=gs
// Number of LBAs to reach this B side sector
sec =SectorB ++// Move to the next sector on side B
Stripe[z].Sector[gs]= sec // Sector number for this Iba
Ratio =SectorB/SectorA // Current ratio
Range.Set(START.LEN)
start =START
len =LEN
end =START+LEN−1
III. Address Translation
Once the Configuration Table is filled in by the user and
the Address Translation Structure is pre-
computed by the given algorithms, the following address
translations are provided.
AddressTranslationStr::ZoneOf( pba)
*// Computes the zone for the given PBA
AddressTranslationStr::SectsPerTrack(pba)
// Comnputes the number of sectors per track at
the given PBA
AddressTranslationStr::TrackOf(pba)
// Computes the Track at the given PBA
AddressTranslationStr::SectorOf(pba)
// Computes the sector for the given PBA
AddressTranslationStr::LbaOf(pba)
// Computes the LBA for the given PBA
AddressTransIationStr::SideOfPba(pba)
// Computes the side of the given PBA
AddressTransIationStr::SideOfPba(Iba)
// Computes the side of the given LBA
AddressTranslationStr::PbaOf(Iba)
// Computes the PBA of the given LBA
AddressTranslationStr::PbaOf(track, sect, side)
// Computes the PBA of the given track and
sector
The details ofthese translation formula follow:
AddressTranslationStr::ZoneOf( Iba)
Side =SideOf ba(pba)
for all zones z
if (pba <=phys[Side].zone[z].range.end)
return z
AddressTranslationStr:: SectsPerTrack( nba)
s =SideOfPba(pba)
z =ZoneOf(s,pba)

APPENDIX A-continued

```
return phys[s].zone[z].sects_per_track
AddressTranslationStr::TrackOf(nba)
side =SideOf pba(pba)
z =ZoneOf( side, pba)
Track =TrackRanges8k[z].start
Track +=(pba-phys[side].zone[z].range.start)/
phys[side].zone[z].sects_per_track
return Track
AddressTranslationStr: :SectorOf( nba)
side =SideO#ba( pba)
z =ZoneOf(side,pba)
return (pba-phys[side].zone[z].range.start) %
phys[side].zone[z].sects_per_track
AddressTranslationStr: :LbaOf( t,ba)
Return Ispace.LbaOf( pba)
AddressTranslationStr: :SideOfPba( pba)
If pba >=phys[SideB].range.start
return SideB
else
return SideA
AddressTranslationStr: : SideOfPba( Iba)
ai =Ispace.AggregateOf( lba)
DeltaLba =Iba - Ispace.ag[ai].range.start
// Number ofLBAs from start of aggregate
pi = DeltaLba % Ispace.SectorsPerAg[ai]
// Pattern index into stripe pattern array
Side =Stripe[ai].Pattern[pi]   // Use the precomputed Pattern array
AddressTranslationStr: :PbaOf( lba)
Return Ispace.PbaOf( Iba)
AddressTranslationStr::PbaOf( track, sect, side)
for all zones z
if track <=TrackRanges8k[z].end)
StartTrack =TrackRanges8k[z].start;
pba =phys[side].zone[z].range.start +// Start pba for this zone
(track StartTrack)*phys[side].zone[z].
sects_per_track +// PBAs in whole tracks
sect // remaining PBAs on
this track
return pba
LbaSnace::PbaOf( Iba)
ai =Aggregateof( iba)
DeltaLba =Iba - ag[ai].range.start
// Number of LBAs fi#om start of aggregate
TrackOffset =DeltaLba/SectorsPerAg[ai]
// Number of tracks from start of aggregate
si =DeltaLba % SectorsPerAg[ai]// Index into stripe array
az =Stripe[ai].Pattern[si]// Aggregate zone for Iba (actually the side)
ret =ag[ai].zone[az].range.start +// starting PBA for this ag zone
TrackOffset * ag[ai].zone[az].sects_per_track +// Add whole tracks
Stripe[ai].Sector[si]// Use the precomputed Sector array
LbaSnace::LbaOf( nba)
as =di.SideO#ba(pba) // Side of PBA
an =di.ZoneOf(as,pba)// aggregate number - Physical zone
if(as=SideB)
an =AggregatezoneDet[z][SideB]
if( pba >=ag[an].zone[as].range.start &&
pba <=ag[an].zone[as].range.end)
DeltaPba =pba - ag[an].zone[as].range.start // Number of PBAs past the zone start
TrackOffset =DeltaPba / ag[an].zone[as].sects_per_track
// Number of tracks into the
zone
pi =(WORD)(DeltaPba % ag[an].zone[as].sects_per_track)
// PBA index into LbaCount
Array
ret =ag[an].range.start +// Aggregate start Lba
TrackOffset * SectorsPerAg[an]+// LBAs in whole tracks
Stripe[an].LbaCount[as][pi]// LBAs in partial group
else // pba is in non-user area
return LBA(-1) // return special value
```

What is claimed is:

1. A data storage system for storing data to a storage media and easily retrieving data from the storage media in response to requests from a host computer which identifies the data by a logical block address, the data storage system comprising:

a storage media having a plurality of storage locations each identified by a media layout address;

a data storage mechanism for writing data to the media and reading data from the media; and a controller for receiving the data request from the host computer and directing the data storage mechanism to appropriately store and retrieve data, the controller having a memory for storing a calculated configuration table which is compiled based on disk set-up information received from a disk user, the controller for further creating an address translation structure based upon the stored configuration table which can then be used to calculate address translations so that the logical block address can be mapped to a media layout address.

2. The data storage system of claim 1 wherein the media is an optical disk.

3. The data storage system of claim 2 wherein the media layout address is a surface-track-sector address for the optical disk.

4. A method performing address mapping to identify a media layout address in a data storage system wherein the storage requests are received from a host computer which identify a logical block address, comprising:

obtaining user information related to the layout of a storage media within the data storage system;

generating a configuration table for the storage media based on disk set-up information received from a disk user;

calculating an address translation structure based upon the configuration table; and determining the related media layout addresses related to the logical block address by using the address translation structure and a predetermined program.

5. The method of claim 4 wherein the media is an optical disk.

6. The method of claim 5 wherein the media layout address is a surface-track-sector address for the optical disk.

7. A data storage device for storing data to a storage media and easily retrieving data from the storage media in response to requests from a host computer which identifies the data by a logical block address, the data storage system comprising:

a storage media having a plurality of storage locations on at least one surface thereof, the storage media having a calculated configuration table, compiled based on disk set-up information received from a disk user, which establishes a number of zones, a number of tracks, and a number of sectors on the storage media, each sector identified by a surface-track-sector address;

a data storage mechanism for writing data to the media and reading data from the media; and a controller for receiving the data request from the host computer and directing the data storage mechanism to appropriately store and retrieve data, the controller having a memory for storing the calculated configuration table, the controller for further creating an address translation structure based upon the stored configuration table which can then be used to calculate address translations so that the logical block address can be mapped to a surface-track-sector address.

8. The data storage device of claim 7 wherein the media is an optical disk.

9. The data storage device of claim 8 wherein the number of sectors contained in each track is not identical.

10. The data storage device of claim 8 wherein the configuration table is compiled by the controller based on the disk set-up information received from the disk user.

11. The data storage device of claim 8 wherein the address translation structure includes a plurality of characteristics of the storage locations, the storage location characteristics computed exclusively from the configuration table.

12. The data storage device of claim 8 wherein the optical disk has storage locations on two surfaces thereof.

13. The data storage device of claim 12 wherein the address translation structure can be used to calculate address translations so that the logical block address can be mapped to a surface-track-sector address on either surface of the optical disk.

14. The data storage device of claim 8 wherein the disk set-up information received from the disk user specifies that the optical disk has storage locations on two surfaces thereof.

15. A data storage system for storing data to a storage media and easily retrieving data from the storage media in response to requests from a host computer which identifies the data by a logical block address, the data storage system comprising:

a storage media having two surfaces and a plurality of storage locations thereon, each storage location identified by a media layout address;

a data storage mechanism for writing data to both surfaces of the media and reading data from both surfaces of the media; and a controller for receiving the data request from the host computer and directing the data storage mechanism to appropriately store and retrieve data, the controller having a memory for storing a calculated configuration table which is compiled by the controller based on disk set-up information received from a disk user, the controller for further creating an address translation structure based upon the stored configuration table which can then be used to calculate address translations so that the logical block address can be mapped to a media layout address.

16. The data storage system of claim 15 wherein the media is an optical disk.

17. The data storage system of claim 16 wherein the data storage mechanism simultaneously writes data to both surfaces of the optical disk and simultaneously reads data from both surfaces of the optical disk.

18. The data storage system of claim 17 wherein the calculated configuration table includes pairing information.

19. The data storage system of claim 17 wherein the address translation structure includes a plurality of characteristics of the storage locations, the storage location characteristics computed exclusively from the configuration table.

20. The data storage system of claim 17 wherein the address translation structure can be used to calculate address translations so that the logical block address can be mapped to a surface-track-sector address on either surface of the optical disk.

21. A data storage system for storing data to a storage media and easily retrieving data from the storage media in response to requests from a host computer which identifies the data by a logical block address, the data storage system comprising:

a storage media having a plurality of storage locations each identified by a media layout address;

a data storage mechanism for writing data to the media and reading data from the media; and a controller for receiving the data request from the host computer and directing the data storage mechanism to appropriately store and retrieve data, the controller also for compiling and storing a calculated configuration table which is compiled based on disk set-up information received from a disk user, which includes a number of zones, a number of tracks and a number of sectors on the storage media, the controller for further creating an address translation structure based upon the stored configuration table which can then be used to calculate address translations so that the logical block address can be mapped to a media layout address.

22. The data storage system of claim 21 wherein the disk set-up information is received from disk user via the host computer.

23. The data storage system of claim 21 wherein the disk set-up information is received from disk user via the storage media.

* * * * *